April 9, 1946.   M. J. MITCHELL   2,398,028
TRACTOR-MOUNTED CORN PICKER
Filed June 19, 1944   2 Sheets-Sheet 1
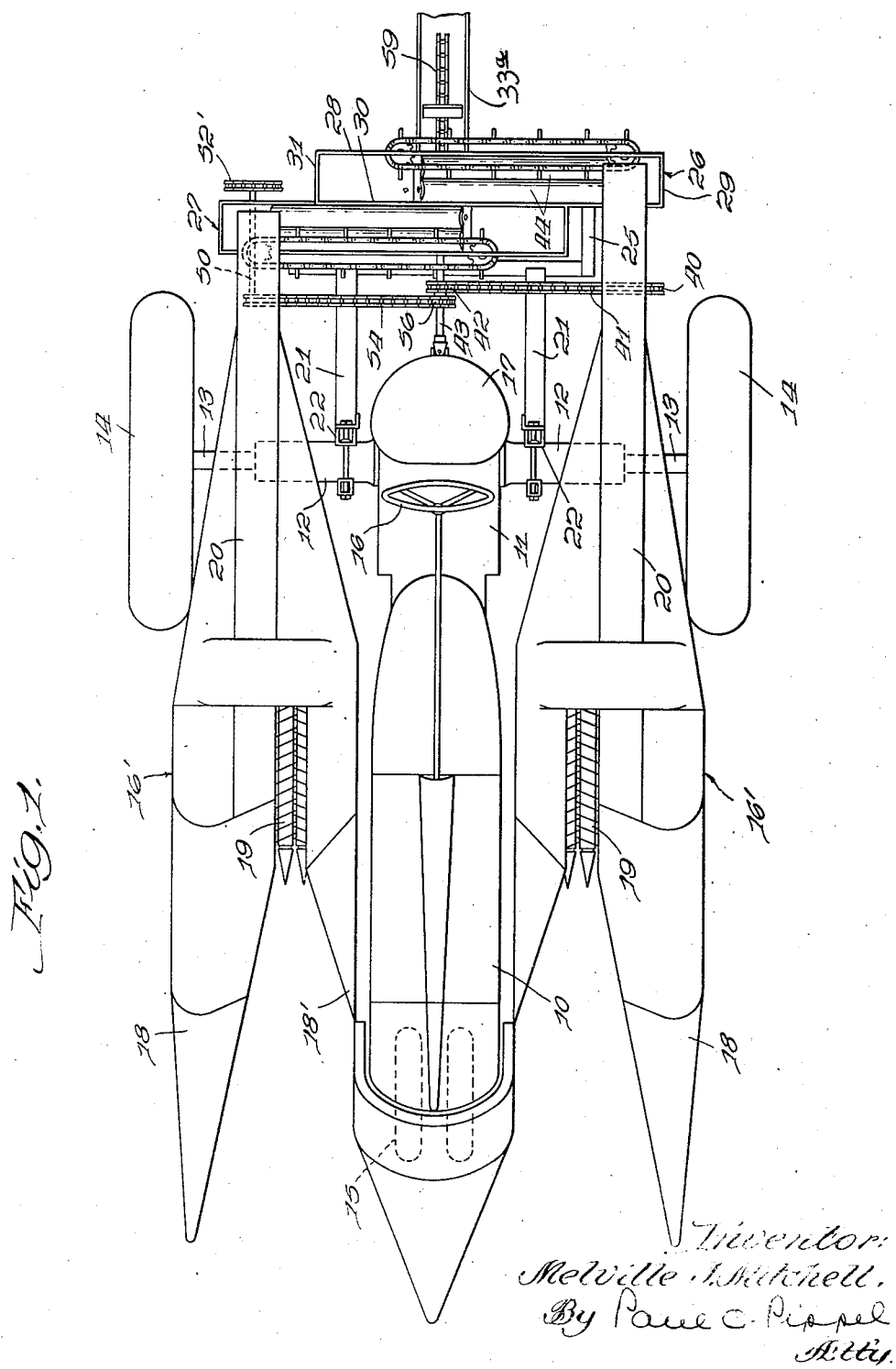

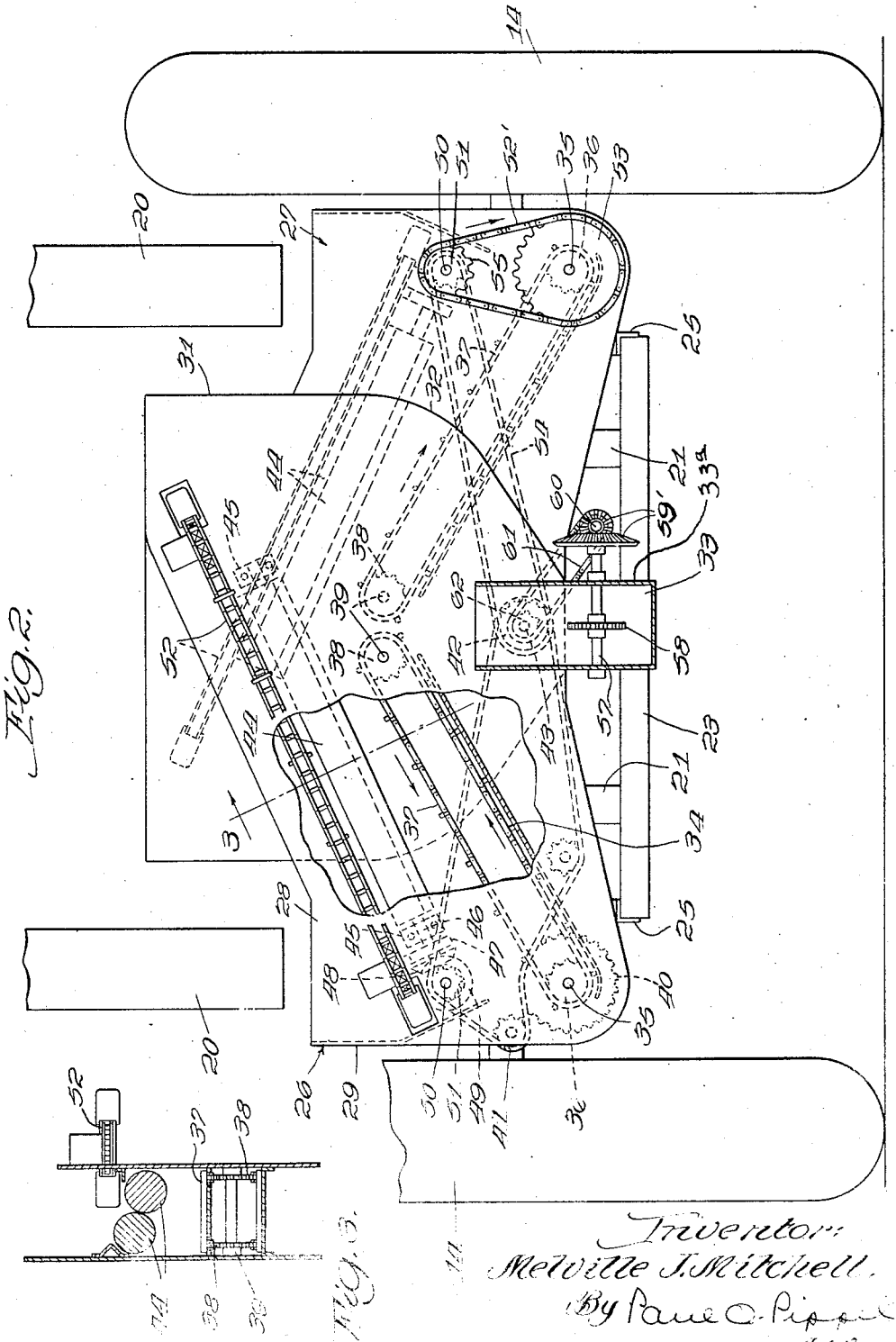

Patented Apr. 9, 1946

2,398,028

UNITED STATES PATENT OFFICE 2,398,028

TRACTOR-MOUNTED CORN PICKER

Melville J. Mitchell, Highland Park, Ill., assignor to International Harvester Company, a corporation of New Jersey Application June 19, 1944, Serial No. 540,954

7 Claims. (Cl. 56—18)

This invention relates to a tractor-mounted corn picker. More specifically, it relates to a husking device particularly adapted to be mounted at the rear of a 2-row tractor-mounted corn picker. In the development of tractor-mounted pickers, the conventional tricycle tractor has been utilized almost universally as it is well adapted to the mounting of either one or two row pickers. The gathering devices are arranged alongside the narrow body of the tractor, usually forwardly thereof so as to be engaged by the front truck of the tractor. The ears are either snapped from the stalks or the stalks are cut and delivered to a rearwardly located snapping mechanism. In either method of harvesting the ears are delivered rearwardly of the rear axle structure of the tractor, at each side thereof. The husking unit may be mounted rigidly on the rear axle structure of the tractor extending transversely across the tractor. It is particularly with a husking unit of this type that the present invention is concerned.

A principal object of the invention is to provide a husking unit attachment for tractors having two sets of husking rolls arranged to provide suitable length of husking surface.

A subsidiary object is to arrange the rolls in overlapping relationship transversely of the tractor in order to obtain the desired operating length.

Another subsidiary object is to incline the rolls to obtain additional effective husking length.

Another principal object is to arrange a receiving hopper with respect to two sets of overlapping husking rolls so as to receive the husked ears of corn and deliver them to an elevator.

In the drawings,

Figure 1 is a plan view of a tractor with a corn picker mounted thereon incorporating the features of the invention;

Figure 2 is an enlarged rear view partially in section of the picker shown in Figure 1 with a portion broken away to show the interior;

Figure 3 is a section taken on the line 3—3 of Figure 2.

In the drawings the tractor has been shown in outline only, and the gathering units at the sides of the tractor have been indicated diagrammatically. The tractor is of the well known tricycle type having a narrow body 10, a rearwardly extending frame structure 11, laterally extending rear axle structures 12, drive axles 13, and traction wheels 14. The front truck of the tractor is indicated in dotted lines in Figure 1 as including a pair of steerable wheels 15. A steering wheel 16 and operator's seat 17 are also indicated. The picking units at the sides of the tractor, indicated generally by the reference character 16', each include an outside gathering point 18 and inside gathering point 18', snapping rolls 19, and a rearwardly extending housing 20 through which the snapped ears are conveyed upwardly and rearwardly by conventional conveyor mechanism. At the rear of the tractor a frame structure is provided including a pair of longitudinal and rearwardly extending frame members 21 which are rigidly connected by clamping members 22 to the rear axle housing structures 12.

The frame members 21 constitute a part of the frame structure including a transverse frame member 23 and longitudinal frame members 25, the husking unit being carried by said frame structure. The detail construction of the supporting frame and of the structural members making up the husking unit are immaterial and form a part of the present invention only as such structure is necessary to provide a structural relationship of the functionally cooperating elements.

The housing or body portion of the husking unit may be considered as two overlapping housings indicated generally by the reference characters 26 and 27. The housing 26 includes a rear transverse vertical wall 28, a longitudinally extending end wall 29, an inner transverse vertical wall 30, and a vertical longitudinal wall 31, the bottom portion 32 of which is curved inwardly to an elevator-receiving chamber 33. The wagon elevator housing is designated by numeral 33ᵃ. An inwardly inclined bottom wall 34 is also connected to the side walls 28 and 30 for a purpose to be hereinafter described.

A transverse shaft 35 mounted at the outer lower end of the housing 26 provides a pivot axis on which conveyor sprockets 36 are mounted. An open flight chain type of conveyor 37 is carried by the sprockets 36 at its lower end and by sprockets 38 at its upper end, said sprockets being mounted on a shaft 39. The shafts 35 and 39 are journaled in supports affixed to the said walls 28 and 30, the other ends of said supports being shown in Figure 2.

The conveyor 37 is driven by a sprocket 40 on the shaft 35. Said sprocket, as shown in Figure 1, is driven by a chain 41 extending to the center of the tractor and over a sprocket 42 mounted on a shaft 43 connected by a universal joint to the tractor power take-off shaft.

The conveyor 37 is operated in the direction indicated by the arrow in Figure 2, a portion of the sheet 28 being broken away to show the operation of the chain. It will be noted that the flights of the conveyor chain pass upwardly in contact with the bottom wall 34, and that the bottom wall is curved outwardly around the conveyor at the bottom and terminates short of the conveyor supporting sprockets at the upper end. This construction provides for the carrying of shelled grain which drops through the open conveyor upwardly and into the ear-corn receiving means whereby the shelled grain is also recovered.

A pair of husking rolls 44 is mounted in an upwardly inclined position extending from a low point adjacent the end wall 29 to a high point adjacent the center of the tractor. Said rolls are journaled for rotation in brackets, two of which 45 are indicated in Figure 2. One of the rolls is provided with a shaft 46 which carries a gear 47 meshing with a gear on the other shaft for driving the rolls in opposite directions. The shaft 46, as indicated in Figure 2, also carries a bevel gear 48 meshing with a bevel gear 49 supported on a longitudinal shaft 50. Said shaft is supported in journal members mounted on the walls 28 and 30 and is driven by a sprocket 51 engaged by the chain 41 previously referred to. An ear-forwarding chain 52 is indicated as being positioned with its flights above one of the husking rolls 44. Said chain may be driven by any suitable gear mechanism such as is used for similar chains located in the same relative position and for the same purpose in husking devices of other types.

The section of the husking unit at the other side of the tractor from that above described, is of the same construction and carries the same reference characters in the drawings.

There is one difference in the drive, which will now be described. The sprocket 51 is driven by a chain 52' connected with a sprocket 53 on the lower conveyor shaft 35. A second chain 54 is connected with a sprocket 55 on the shaft 50 and with a sprocket 56 mounted on the power-driven shaft 43.

The elevator receiving compartment 33 carries a transverse shaft 57 in which the sprocket 58 is mounted for driving an elevator conveyor 59 within the elevator housing 33ᵃ as shown in Figure 1. The shaft 57 is driven by a set of bevel gears 59', one of the gears being mounted on a transverse shaft 60 which is connected by a chain 61 with a sprocket 62 mounted on the power-driven shaft 43.

In the operation of a husking unit as above described, snapped ears of corn are delivered into the housings 26 and 27 from the conveyor housing 20. The ears falling at the lower end of the husking rolls 44 are engaged and carried upwardly therealong by the conveyor chains 52 which act as ear-forwarding means. The husked ears are moved over the upper ends of the husking rolls and fall downwardly into the hopper-like structure, being deflected by the inclined bottom walls 32 into the elevator-receiving means 33.

The husks passing between and through the husking rolls 44 are moved downwardly and outwardly from the center of the tractor by conveyors 37. The shelled grain passing through the rolls is shaken from the husks falling through the open conveyor onto the bottom wall 34. The lower run of the conveyor carries said grain upwardly and delivers it into the elevator-receiving means or compartment 33.

By a construction as disclosed, the rolls may be made considerably longer than if they had been arranged in alignment with each other and positioned horizontally. With the construction disclosed the rolls may be extended upwardly a considerably further distance than disclosed if for husking operations it is found desirable to provide longer rolls.

It is to be understood that only a preferred embodiment of the operation of his invention has been disclosed and claimed by applicant, and that all variations in roll structure, their arrangement, conveyor construction and its arrangement covered by the appended claims is contemplated as being part of the invention.

What is claimed is:

1. In a corn picker construction for tractors comprising in combination with a tractor having a narrow body, a wide rear axle structure at the rear of said body and wide spaced traction wheels on said axle structure, a pair of harvesting units, one mounted at each side of the tractor and extending rearwardly beyond the axle structure, said units including means for snapping ears from the stalks and delivering said ears beyond the rear axle structure, and a husking unit mounted at the rear of the tractor, said unit including two pairs of husking rolls, each pair extending from opposite sides of the tractor inwardly toward the center of the tractor, one pair being spaced longitudinally of the tractor from the other whereby the rolls may overlap at their inner ends and whereby each set of rolls may extend transversely beyond the center line of the tractor.

2. In a corn picker construction for tractors comprising in combination with a tractor having a narrow body, a wide rear axle structure at the rear of said body and wide spaced traction wheels on said axle structure, a pair of harvesting units, one mounted at each side of the tractor and extending rearwardly between the body and the traction wheels, said units including means for snapping ears from the stalks and delivering said ears beyond the rear axle structure, a husking unit mounted at the rear of the tractor, said unit including two pairs of husking rolls, each pair extending from opposite sides of the tractor inwardly toward the center of the tractor, one pair being spaced longitudinally of the tractor from the other whereby the rolls may overlap and whereby each set of rolls may extend transversely beyond the center line of the tractor, ear-forwarding means positioned above the husking rolls, and a husked ear-receiving means positioned to receive ears from both sets of husking rolls.

3. In a corn picker construction for tractors comprising in combination with a tractor having a narrow body, a wide rear axle structure at the rear of said body and wide spaced traction wheels on said axle structure, a pair of harvesting units, one mounted at each side of the tractor and extending rearwardly over the axle structure between the body and the traction wheels, said units including means for snapping ears from the stalks and delivering said ears beyond and above the rear axle structure, a husking unit mounted at the rear of the tractor, said unit including two pairs of husking rolls extending inwardly from opposite sides of the tractor for receiving ears delivered by the harvesting units to a position adjacent the center of the tractor, one pair being spaced longitudinally from the other whereby the rolls may overlap and whereby each set of rolls may extend transversely beyond the center line of the tractor, ear-forwarding means positioned above the husking rolls operative to move the ears inwardly, and a husked ear-receiving means positioned to receive ears from both sets of husking rolls.

4. In a corn picker construction for tractors comprising in combination with a tractor having a narrow body, a wide rear axle structure at the rear of said body and wide spaced traction wheels on said axle structure, a pair of harvesting units, one mounted at each side of the tractor and extending rearwardly over the axle structure between the body and the traction wheels, said units including means for snapping ears from the stalks and delivering said ears beyond the rear axle structure, a husking unit mounted at the rear of the tractor, said unit including two pairs of husking rolls, one pair extending from each side of the tractor toward the center of the tractor, one pair being spaced longitudinally of the tractor from the other whereby the rolls may overlap and whereby each set of rolls may extend inwardly transversely beyond the center line of the tractor, said rolls being inclined with respect to horizontal, and a husked ear-receiving means positioned to receive ears from both sets of husking rolls.

5. In a corn picker construction for tractors comprising in combination with a tractor having a narrow body, a wide rear axle structure at the rear of said body and wide spaced traction wheels on said axle structure, a pair of harvesting units, one mounted at each side of the tractor and extending rearwardly over the axle structure between the body and the traction wheels, said units including means for snapping ears from the stalks and delivering said ears beyond the rear axle structure, a husking unit mounted at the rear of the tractor, said unit including two pairs of transversely extending husking rolls, one pair of rolls at each side of the tractor and extending inwardly from the respective sides of the tractor toward the center thereof, one pair being spaced longitudinally of the tractor from the other whereby the rolls may overlap and whereby each set of rolls may extend transversely beyond the center line of the tractor, said rolls being inclined upwardly toward the center of the tractor, ear-forwarding means positioned above the husking rolls and acting to carry ears to be husked upwardly thereover, and a husked ear-receiving means positioned to receive ears from both sets of husking rolls.

6. In a corn picker construction for tractors comprising in combination with a tractor having a narrow body, a wide rear axle structure at the rear of said body and wide spaced traction wheels on said axle structure, a pair of harvesting units, one mounted at each side of the tractor and extending rearwardly over the axle structure between the body and the traction wheels, said units including means for snapping ears from the stalks and delivering said ears downwardly beyond the rear axle structure, a husking unit mounted at the rear of the tractor, said unit including two pairs of transversely extending husking rolls, said pair of rolls extending inwardly opposite each other and inclined upwardly toward the center of the tractor, ear-forwarding means positioned above the husking rolls and acting to carry ears to be husked upwardly thereover, and a husked ear-receiving means positioned to receive ears from both sets of husking rolls.

7. In a corn picker construction for tractors comprising in combination with a tractor having a narrow body, a wide rear axle structure at the rear of said body and wide spaced traction wheels on said axle structure, a pair of harvesting units, one mounted at each side of the tractor and extending rearwardly over the axle structure between the body and the traction wheels, said units including means for snapping ears from the stalks and delivering said ears downwardly at laterally spaced location beyond the rear axle structure, a husking unit mounted at the rear of the tractor, said unit including two pairs of husking rolls, one pair being spaced longitudinally of the tractor from the other whereby the rolls may overlap and whereby each set of rolls may extend transversely beyond the center line of the tractor, each pair of said rolls having its outer end positioned to receive snapped ears being delivered by one of the harvesting units and being inclined upwardly therefrom toward and beyond the center of the tractor, ear-forwarding means positioned above the husking rolls and acting to carry ears to be husked upwardly thereover, and a husked ear-receiving means having portions extending around the upper terminating ends of the husking rolls to receive ears therefrom.

MELVILLE J. MITCHELL.